W. GREER.
MOTOR VEHICLE.
APPLICATION FILED NOV. 6, 1919.
1,351,641.
Patented Aug. 31, 1920.
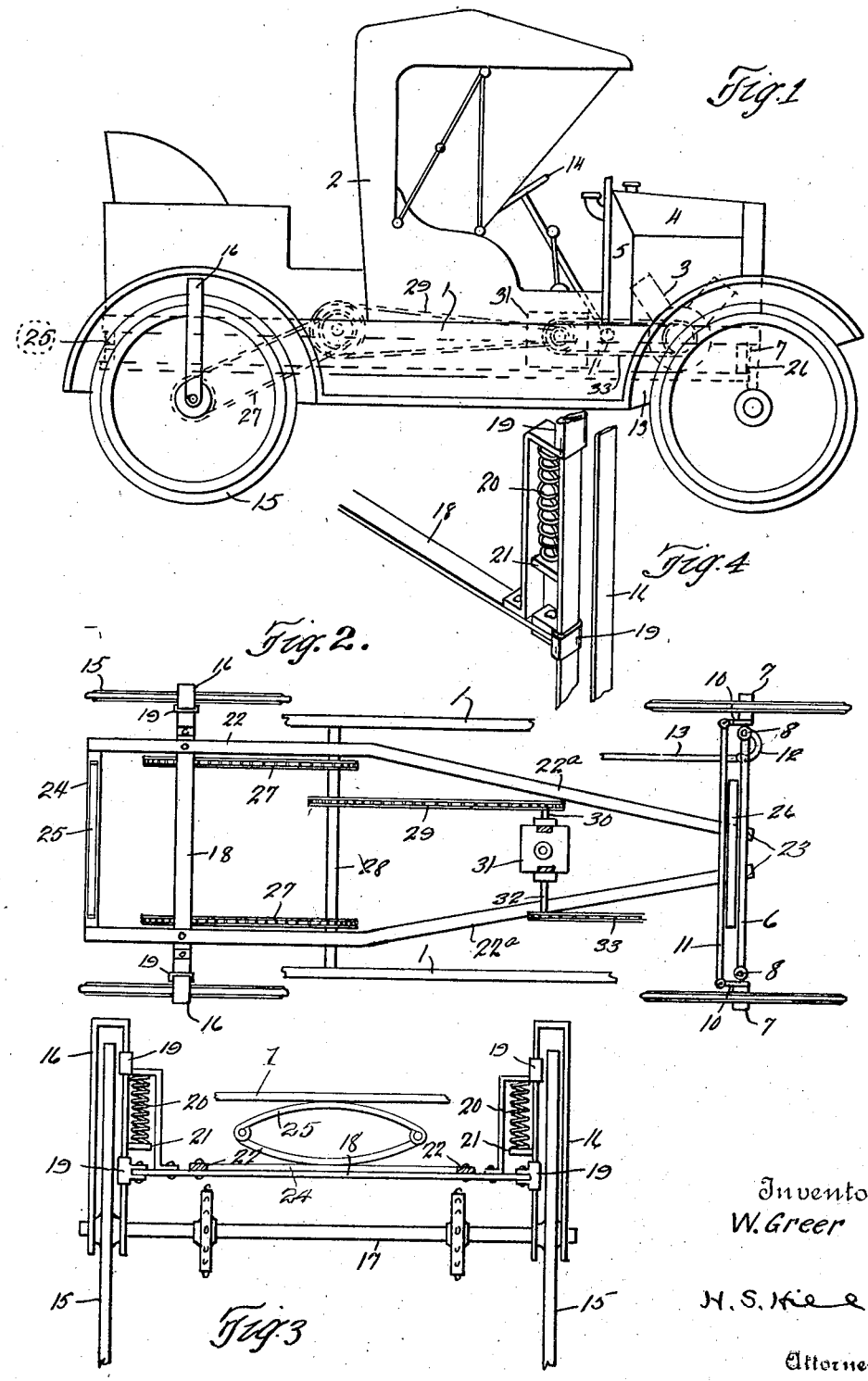

UNITED STATES PATENT OFFICE.

WILLIE GREER, OF OSCEOLA, ARKANSAS.

MOTOR-VEHICLE.

1,351,641.

Specification of Letters Patent.   Patented Aug. 31, 1920.

Application filed November 6, 1919. Serial No. 336,134.

*To all whom it may concern:*

Be it known that I, WILLIE GREER, a citizen of the United States, residing at Osceola, in the county of Mississippi, State of Arkansas, have invented a new and useful Motor-Vehicle; and I do hereby declare the following to be a full, clear, and exact description of the invention, such as will enable others skilled in the art to which it appertains to make and use the same.

The present invention relates to a motor vehicle, and has for its object to provide a device of this character which embodies novel features of construction whereby the wheels, engine and other parts of a motorcycle can be used in combination with a buggy body in the construction of a four-wheeled vehicle.

Further objects of the invention are to provide a device of this character which embodies novel features of construction whereby shocks and jars will be effectively absorbed and an easy riding vehicle provided.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a vehicle constructed in accordance with the invention.

Fig. 2 is a top plan view of the running gear, portions being broken away and shown in section.

Fig. 3 is a rear view of the running gear and the rear wheel mountings.

Fig. 4 is a detail perspective view of the resilient connection between one end of the rear cross bar and the adjacent rear wheel fork.

Corresponding and like parts are referred to in the following description and indicated in all the views of the drawings by the same reference characters.

Referring to the drawings, which illustrate one embodiment of the invention, the numeral 1 designates the main frame upon which the body 2 and engine 3 are mounted, the engine being shown as located at the front of the frame and under a hood which is provided with a gasolene tank 4 and an oil reservoir 5. The front axle 6 is provided at its ends with the usual spindles 7 which are pivotally connected thereto at 8, the front wheels 9 being mounted upon the said spindles. These spindles are provided with the rearwardly extending arms 10 which are connected by a transverse rod 11 so that both of the spindles must turn in unison, and one of the spindles is provided with the usual steering arm 12 which has the conventional connection 13 with a steering wheel 14.

The rear wheels 15 are positioned within upright forks 16 and applied to a rear axle 17 of which the ends extend through the arms of the respective forks. A cross bar 18 connects the rear forks 16 and has a yieldable engagement therewith. Each end of the cross bar is provided with a pair of guides 19 which slidably engage the inner side of the respective fork 16, and a spring 20 is interposed between the upper guide and an abutment 21 on the fork, said springs being compressed by the weight of the vehicle body which is supported by the cross bar. A pair of longitudinally extending bars 22 rest on the cross bar 18 and the forward ends thereof converge at 22$^a$ and are secured at 23 to the front axle 6, while the rear ends thereof are connected by an end bar 24. Rear springs 25 are interposed between this end bar 24 and the rear end of the frame 1, while the front springs 26 are interposed between the forward ends of the longitudinal bars 22 and the front of the main frame 1, thereby providing a yieldable mounting for the latter.

The rear axle 17 has the two chain and sprocket connections 27 to a countershaft 28 which is journaled upon the main frame 1. The countershaft has a chain and sprocket connection 29 with a driven shaft 30 of a conventional transmission gearing 31. The driving shaft 32 of this transmission gearing is shown as having a chain and sprocket connection 33 with the engine 3, thereby providing for transmitting power at different speeds from the engine to the rear wheels 15. The two sets of rear springs 20 and 25 will coöperate with each other to absorb the shocks and jars in a most effective manner and provide an easy riding vehicle.

Having thus described the invention, what

I claim as new and desire to secure by Letters Patent, is:—

1. A motor driven vehicle including upright forks, wheels journaled within the forks, a cross bar connecting the forks and yieldably engaging the same, a main frame supported upon the cross bar, and springs interposed between the main frame and the cross bar.

2. A motor driven vehicle including a pair of upright forks, wheels journaled within the forks, a cross bar connecting the forks and slidably engaging the inner arms thereof, abutments on the forks, springs interposed between the abutments and the cross bar, and a main frame supported upon the cross bar.

3. A motor vehicle including a pair of upright forks, wheels journaled within the forks, a cross bar connecting the forks and provided at each end with a pair of spaced guides slidably engaging the inner arm of the respective fork, abutments upon the forks, cushioning springs interposed between the upper guides and the abutments, and a main frame supported upon the cross bar.

4. A motor vehicle including a pair of upright forks, an axle connecting the forks and extending through the arms thereof, wheels applied to the axles and arranged within the forks, a cross bar connecting the forks and provided at the ends thereof with guide members slidably engaging the inner arms of the respective forks, abutments on the forks, springs interposed between the abutments and the guide members, a main frame supported from the cross bar, and springs interposed between the main frame and the cross bar.

In testimony whereof I have signed my name to this specification in the presence of two subscribing witnesses.

WILLIE GREER.

Witnesses:
 NICK BRANCH,
 L. G. CLEERE.